(12) United States Patent
Bjorling et al.

(10) Patent No.: US 11,481,115 B2
(45) Date of Patent: Oct. 25, 2022

(54) HOST-MANAGED HARDWARE COMPRESSION WITH ZONED NAMESPACES

(71) Applicant: Western Digital Technologies, Inc., San Jose, CA (US)

(72) Inventors: Matias Bjorling, Copenhagen (DK); Mark D. Myran, Trabuco Canyon, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/184,170

(22) Filed: Feb. 24, 2021

(65) Prior Publication Data

US 2022/0050599 A1 Feb. 17, 2022

Related U.S. Application Data

(60) Provisional application No. 63/066,739, filed on Aug. 17, 2020.

(51) Int. Cl.
*G06F 3/06* (2006.01)
*G06F 12/02* (2006.01)

(52) U.S. Cl.
CPC .......... *G06F 3/0608* (2013.01); *G06F 3/0658* (2013.01); *G06F 3/0679* (2013.01); *G06F 12/0246* (2013.01); *G06F 2212/1044* (2013.01)

(58) Field of Classification Search
None
See application file for complete search history.

(56) References Cited

U.S. PATENT DOCUMENTS

| 2017/0024160 A1* | 1/2017 | Feldman | G06F 3/064 |
| 2021/0263682 A1* | 8/2021 | Jeon | G06F 12/0246 |

OTHER PUBLICATIONS

NVM Express, Base Specification, Revision 1.4, Jun. 10, 2019, full document.

* cited by examiner

*Primary Examiner* — Kevin Verbrugge
(74) *Attorney, Agent, or Firm* — Patterson & Sheridan, LLP; Steven H. VerSteeg

(57) ABSTRACT

The present disclosure generally relates to data storage devices, such as solid state drives. The data storage device includes a controller that includes a compression engine. The controller receives a ZNS append command to write data to a media, such as a non-volatile memory. The compression engine compresses data from a first number of logical blocks to second number of logical blocks. The compressed data is programmed to the media. The compressed data has a media logical block address and a host logical block address, where the media logical block address is the actual LBA where the ZNS append places the data on the media and the host logical block address is the location of the data stored on the media from the host's point of view. The host generates an index of the location of the stored data and the controller programs the index to the relevant location in the media.

20 Claims, 11 Drawing Sheets

HOST-MANAGED HARDWARE COMPRESSION WITH ZONED NAMESPACES

CROSS-REFERENCE TO RELATED APPLICATIONS

This application claims benefit of U.S. provisional patent application Ser. No. 63/066,739, filed Aug. 17, 2020, which is herein incorporated by reference.

BACKGROUND OF THE DISCLOSURE

Field of the Disclosure

Embodiments of the present disclosure generally relate to storage devices, such as solid state drives (SSDs).

Description of the Related Art

Storage devices, such as SSDs, may be used in computers in applications where relatively low latency and high capacity storage are desired. For example, SSDs may exhibit lower latency, particularly for random reads and writes, than hard disk drives (HDDs). Typically, a controller of the SSD receives a command to read or write data from a host device to a memory device. The data is read and written to one or more blocks in the memory device. Each of the blocks is associated with a logical block address so that the SSD and/or the host device know the location of where the data is stored.

One or more blocks may be grouped together by their respective logical block addresses to form a plurality of zones in a zoned namespace (ZNS) architecture. Within any particular zone, data from the host may only be written to media sequentially. When there are no more writable blocks within a zone, the zone is filled or at capacity. The host may request the SSD to reset the filled or at capacity zone. When the zone is reset, the data stored in the zone is erased, such that the host may write new data to the newly erased zone.

The controller of the SSD maintains a write pointer for each zone, indicating where new host data will be appended to the zone. The host may issue write operations through a ZNS Zone Append command. Each time the host appends data to a zone, using the ZNS Zone Append command, the SSD returns the LBA or sector of the first block of the written data. The returned LBA or sector of the first block of the written data indicates the location of the programmed data on the media. The host may use this information to manage and track the layout of the data on the media.

The host device may send write commands of any size to the storage device. Because the write commands may be in any size, the aggregate size of the data written to the storage device may quickly reach the memory capacity of the storage device. However, by utilizing a compression algorithm, the size of the data written to the blocks may be less than the size of the data received from the host. Current compression solutions may complicate storage device hardware and firmware, resulting in increased cost and production schedules, as well as an uncertainty of compression reliability.

Thus, what is needed is a new method of compressing data.

SUMMARY OF THE DISCLOSURE

The present disclosure generally relates to data storage devices, such as solid state drives. The data storage device includes a controller that includes a compression engine. The controller receives a ZNS Zone Append command to write data to a media, such as a non-volatile memory. The compression engine compresses data from a first number of logical blocks to second number of logical blocks. The compressed data is programmed to the media. The compressed data has a media logical block address and a host logical block address, where the media logical block address is the actual LBA where the data storage device places the data on the media and the host logical block address is the location of the data stored on the media from the host's point of view.

In one embodiment, a data storage device includes a non-volatile storage unit, where a capacity of the non-volatile storage unit is divided into a plurality of zones, and a controller coupled to the non-volatile storage unit. The controller includes a compression engine. The controller is configured to receive one or more commands to write data to a first zone of the plurality of zones from a host device, where each command includes one or more chunks of data, compress one or more chunks of the one or more chunks of data to compressed data utilizing the compression engine, where the one or more chunks are compressed to one or more grains, and write the compressed data to a first location in the first zone.

In another embodiment, a data storage device includes a non-volatile storage unit, where a capacity of the non-volatile storage unit is divided into a plurality of zones, and a controller coupled to the non-volatile storage unit. The controller includes a compression engine. The controller is configured to receive one or more commands to write data to a first zone of a plurality of zones from a host device, receive data associated with the one or more commands from the host device, group the received data into chunks, utilize the compression engine with a compression ratio to compress the data associated with the one or more commands from a chunk to an integral number of grains, write the compressed data associated with one or more commands to a first location in the first zone, record the first location, where the first location includes a media logical block address (LBA) and a host LBA, and report to the host device the host LBA.

In another embodiment, a data storage device includes a non-volatile storage unit, where a capacity of the non-volatile storage unit is divided into a plurality of zones. The data storage device further includes means to compress data received from a host device, where the means to compress data is coupled to the non-volatile storage unit, means to write compressed data to logical block address (LBA) range in at least one zone of the plurality of zones, where the means to write compress data is coupled to the non-volatile storage unit, and means to report a host LBA range to the host device, where the host LBA range is different from the LBA range where the compressed data is written, wherein the means to report is coupled to the non-volatile storage unit.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives. The data storage device includes a controller that includes a compression engine. The controller receives a ZNS Zone Append command to write data to a media, such as a non-volatile memory. The compression engine compresses data from a first number of logical blocks to second number of logical blocks. The compressed data is programmed to the media. The compressed data has a media logical block address and a host logical block address, where the media logical block address is the actual LBA where the ZNS append places the data on the media and the host logical block address is the location of the data stored on the media from the host's point of view.

Figure 1:
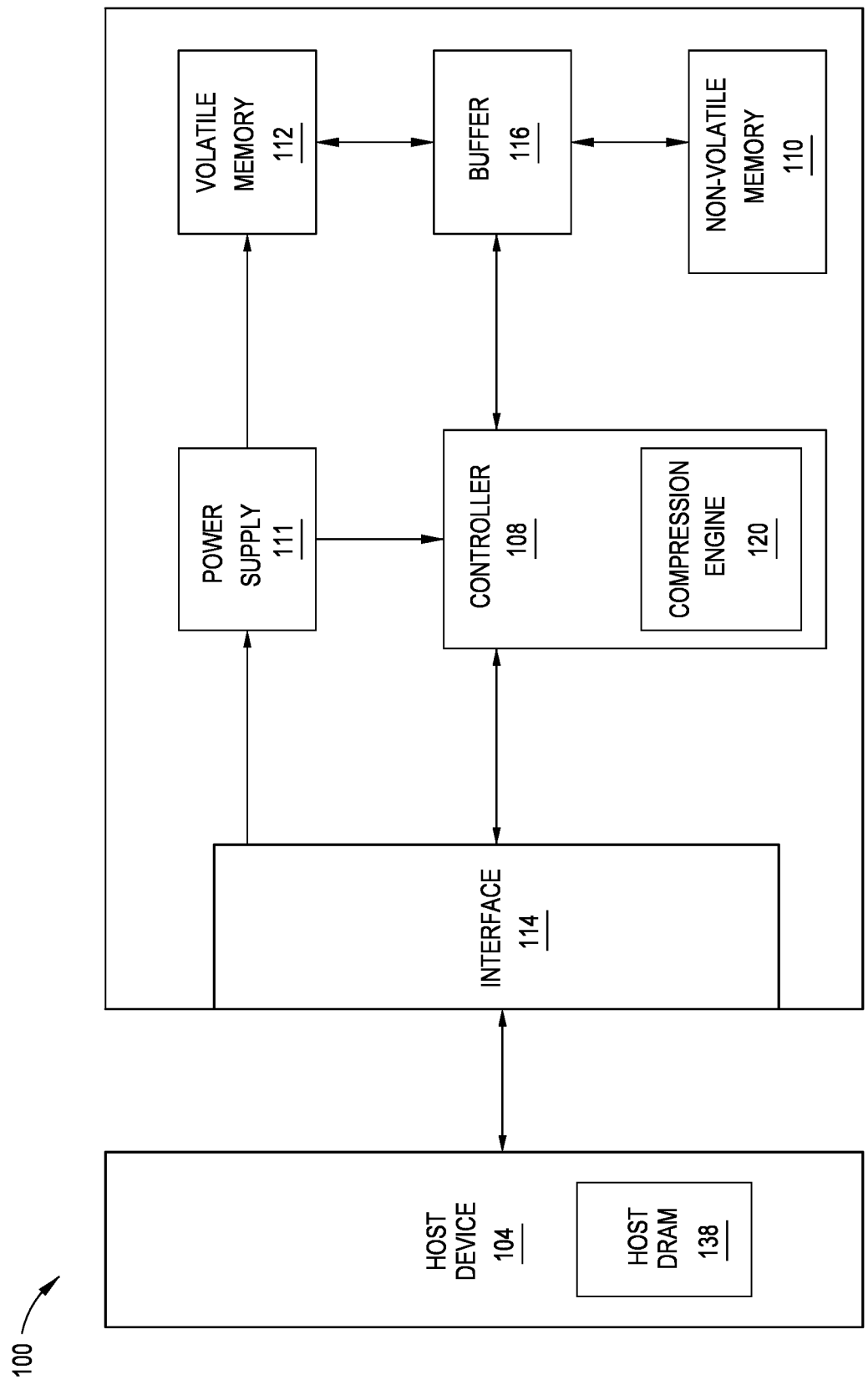
FIG. 1 is a schematic block diagram illustrating a storage system, according to one embodiment.

FIG. 1 is a schematic block diagram illustrating a storage system 100 in which data storage device 106 may function as a storage device for a host device 104, in accordance with one or more techniques of this disclosure. For instance, the host device 104 may utilize a non-volatile memory (NVM) 110 included in data storage device 106 to store and retrieve data. The host device 104 comprises a host DRAM 138. In some examples, the storage system 100 may include a plurality of data storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The storage system 100 includes a host device 104, which may store and/or retrieve data to and/or from one or more storage devices, such as the data storage device 106. As illustrated in FIG. 1, the host device 104 communicates with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The data storage device 106 includes a controller 108, NVM 110, a power supply 111, volatile memory 112, an interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The data storage device 106 includes NVM 110, which may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. Flash memory devices may include NAND or NOR based flash memory devices and may store data based on a charge contained in a floating gate of a transistor for each flash memory cell. In NAND flash memory devices, the flash memory device may be divided into a plurality of blocks, which may be divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. The controller 108 includes a compression engine 120, which may utilize a data compression algorithm to reduce the size of the data received by the controller prior to programming the data to the NVM 110. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory or write buffer 116 before sending the data to the NVM 110.

Figure 2A:
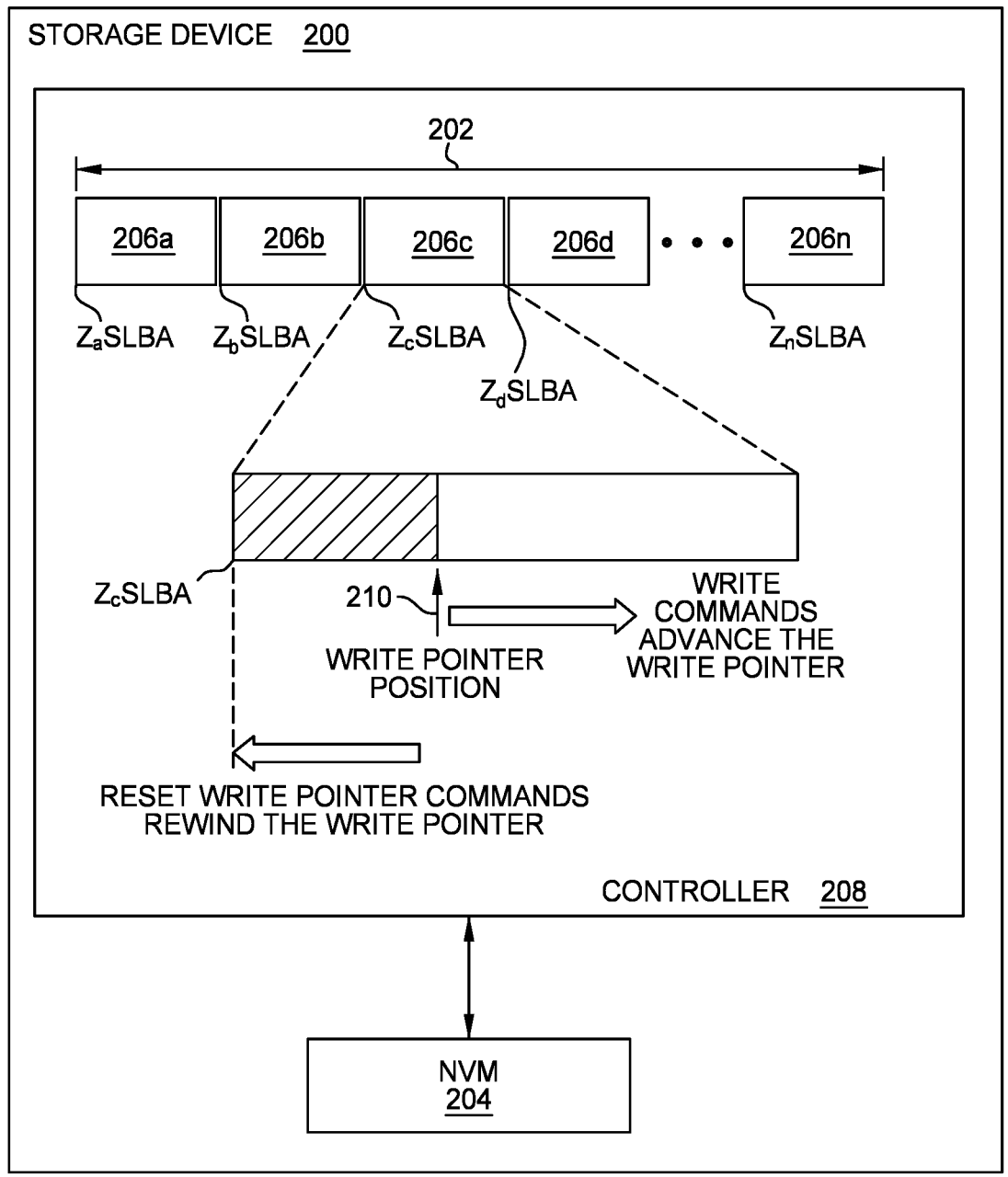
FIG. 2A illustrates a zoned namespace utilized in a storage device, according to one embodiment.
Figure 2B:
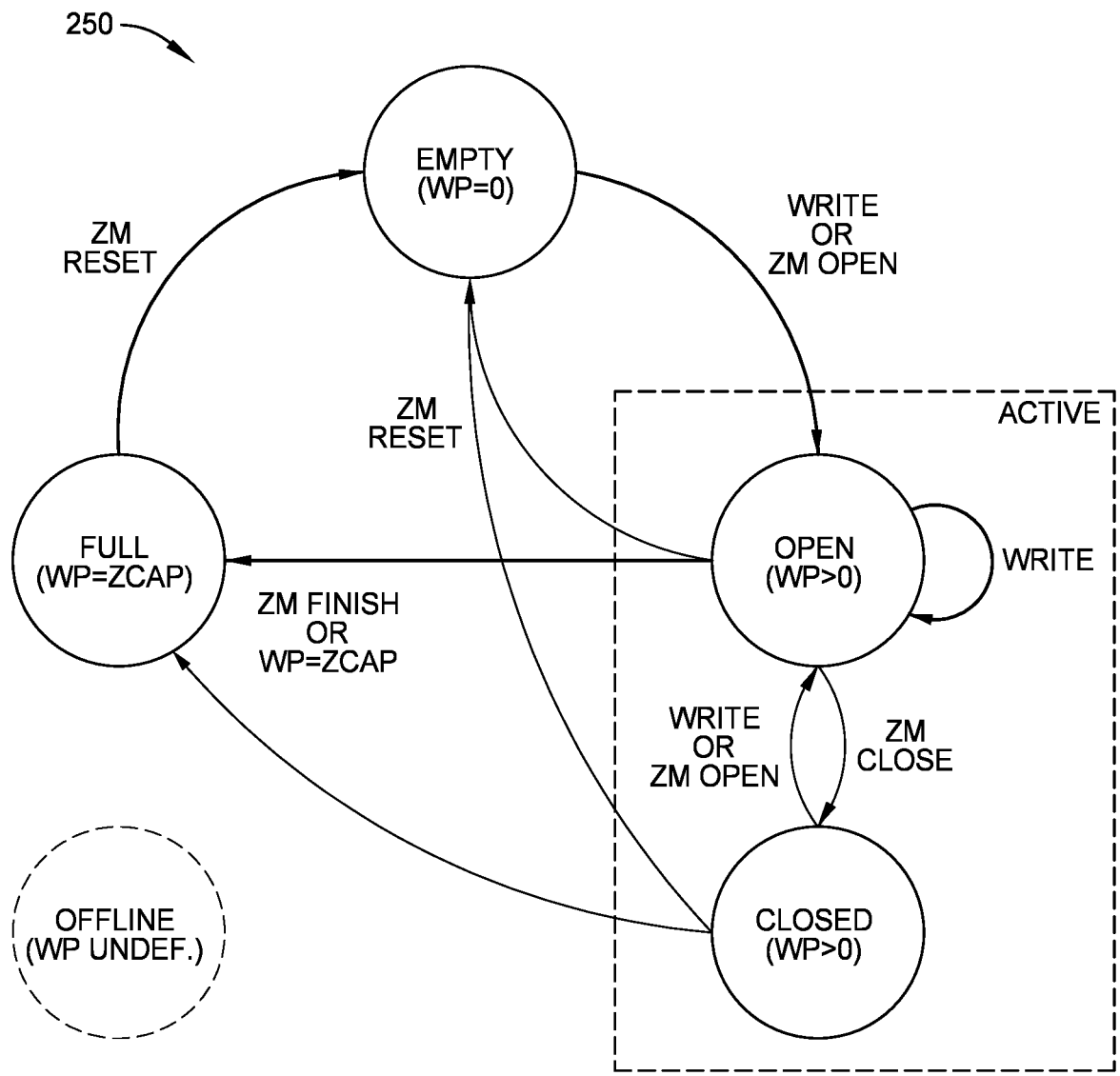
FIG. 2B illustrates a state diagram for the zoned namespaces of the storage device of FIG. 2A, according to one embodiment.

FIG. 2A illustrates a Zoned Namespaces (ZNS) 202 view utilized in a storage device 200, according to one embodiment. The storage device 200 may present the ZNS 202 view to a host device. FIG. 2B illustrates a state diagram 250 for the ZNS 202 of the storage device 200, according to one embodiment. The storage device 200 may be the storage device 106 of the storage system 100 of FIG. 1. The storage device 200 may have one or more ZNS 202, and each ZNS 202 may be different sizes. The storage device 200 may further comprise one or more conventional namespaces in addition to the one or more Zoned Namespaces 202. Moreover, the ZNS 202 may be a zoned block command (ZBC) for SAS, a zoned-device ATA command set (ZAC) for SATA, and/or a zoned namespace for NVMe. Host side zone activity may be more directly related to media activity in zoned drives due to the relationship of logical to physical activity possible.

In the storage device 200, the ZNS 202 is the quantity of NVM that can be formatted into logical blocks such that the capacity is divided into a plurality of zones 206a-206n (collectively referred to as zones 206). The NVM may be the storage unit or NVM 110 of FIG. 1. Each of the zones 206 comprise a plurality of physical or blocks (not shown) of a memory unit or NVM 204, and each of the blocks are associated a plurality of logical blocks (not shown). Each of the zones 206 may have a size aligned to the capacity of one or more blocks of a NVM or NAND device. When the controller 208 receives a command, such as from a host device (not shown) or the submission queue of a host device, the controller 208 can read data from and write data to the plurality of logical blocks associated with the plurality of blocks of the ZNS 202. Each of the logical blocks is associated with a unique LBA or sector.

In one embodiment, the NVM 204 is a NAND device. The NAND device comprises one or more dies. Each of the one or more dies comprises one or more planes. Each of the one or more planes comprises one or more blocks. Each of the one or more blocks comprises one or more wordlines (e.g., 256 wordlines). Each of the one or more wordlines may be addressed in one or more pages. For example, an MLC NAND die may use upper page and lower page to reach the two bits in each cell of the full wordline (e.g., 16 KiB per page). Furthermore, each page can be accessed at a granularity equal to or smaller than the full page. A controller can frequently access NAND in user data granularity logical block address (LBA) sizes of 512 bytes. Thus, as referred to in the below description, NAND locations are equal to a granularity of 512 bytes. As such, an LBA size of 512 bytes and a page size of 16 KiB for two pages of an MLC NAND results in 32 LBAs per wordline. However, the NAND location size is not intended to be limiting, and is merely used as an example.

When data is written to a zone, one or more logical blocks are correspondingly updated within a zone 206 to track where the data is located within the NVM 204. Data may be written to one zone 206 at a time until a zone 206 is full, or to multiple zones 206 such that multiple zones 206 may be partially full. Similarly, when writing data to a particular zone 206, data may be written to the plurality of blocks one block at a time, in sequential order of NAND locations, page-by-page, or wordline-by-wordline, until moving to an adjacent block (i.e., write to a first block until the first block is full before moving to the second block), or to multiple blocks at once, in sequential order of NAND locations, page-by-page, or wordline-by-wordline, to partially fill each block in a parallel fashion (i.e., writing the first NAND location or page of each block before writing to the second NAND location or page of each block). This sequential programming of every NAND location is a typical non-limiting requirement of many NAND blocks.

When a controller 208 selects the blocks that will store the data for each zone, the controller 208 will be able to choose the blocks either at the zone open time, or it may choose the blocks as it reaches a need to fill the first wordline of that particular block. This may be more differentiating when the above described method of filling one block completely prior to starting the next block is utilized. The controller 208 may use the time difference to select a more optimal block in a just-in-time basis. The decision of which block is allocated and assigned for each zone and its contiguous LBAs can be occurring for zero or more concurrent zones at all times within the controller 208.

Each of the zones 206 is associated with a zone starting logical block address (ZSLBA) or zone starting sector. The ZSLBA is the first available LBA in the zone 206. For example, the first zone 206a is associated with $Z_a$SLBA, the second zone 206b is associated with $Z_b$SLBA, the third zone 206c is associated with $Z_c$SLBA, the fourth zone 206d is associated with $Z_d$SLBA, and the $n^{th}$ zone 206n (i.e., the last zone) is associated with $Z_n$SLBA. Each zone 206 is identified by its ZSLBA, and is configured to receive sequential writes (i.e., writing data to the NVM 110 in the order the write commands are received).

As data is written to a zone 206, a write pointer 210 is advanced or updated to point to or to indicate the next available block in the zone 206 to write data to in order to track the next write starting point (i.e., the completion point of the prior write equals the starting point of a subsequent write). Thus, the write pointer 210 indicates where the subsequent write to the zone 206 will begin. Subsequent write commands are 'zone append' commands, where the data associated with the subsequent write command appends to the zone 206 at the location the write pointer 210 is indicating as the next starting point. An ordered list of LBAs within the zone 206 may be stored for write ordering. Each zone 206 may have its own write pointer 210. Thus, when a write command is received, a zone is identified by its ZSLBA, and the write pointer 210 determines where the write of the data begins within the identified zone.

FIG. 2B illustrates a state diagram 250 for the ZNS 202 of FIG. 2A. In the state diagram 250, each zone may be in a different state, such as empty, open, closed, full, read only, or offline. When a zone is empty, the zone is free of data (i.e., none of the blocks in the zone are currently storing data) and the write pointer is at the ZSLBA (i.e., WP=ZSLBA). For example, when the NVM is NAND flash, all of the blocks in the zone are freshly erased when the zone is empty. An empty zone switches to an open and active zone once a write is scheduled to the zone or if the zone open command is issued by the host. Zone management (ZM) commands can be used to move a zone between zone open and zone closed states, which are both active states. If a zone is active, the zone comprises open blocks that may be written to, and the host may be provided a description of recommended time in the active state. The controller 208 comprises the ZM. Zone metadata may be stored in the ZM and/or the controller 208.

The term "written to" includes programming user data on 0 or more NAND locations in a block and/or partially filled NAND locations in a block when user data has not filled all of the available NAND locations. The term "written to" may further include moving a zone to full due to internal drive handling needs (open block data retention concerns because the bits in error accumulate more quickly on open blocks), the storage device 200 closing or filling a zone due to resource constraints, like too many open zones to track or discovered defect state, among others, or a host device closing the zone for concerns such as there being no more data to send the drive, computer shutdown, error handling on the host, limited host resources for tracking, among others.

The active zones may be either open or closed. An open zone is an empty or partially full zone that is ready to be written to and has resources currently allocated. The data received from the host device with a write command or zone append command may be programmed to an open block that is not currently filled with prior data. A closed zone is an empty or partially full zone that is not currently receiving writes from the host in an ongoing basis. The movement of a zone from an open state to a closed state allows the controller 208 to reallocate resources to other tasks. These tasks may include, but are not limited to, other zones that are open, other conventional non-zone regions, or other controller needs.

In both the open and closed zones, the write pointer is pointing to a place in the zone somewhere between the ZSLBA and the end of the last LBA of the zone (i.e., WP>ZSLBA). Active zones may switch between the open and closed states per designation by the ZM, or if a write is scheduled to the zone. Additionally, the ZM may reset an active zone to clear or erase the data stored in the zone such that the zone switches back to the empty state. Once an active zone is full, the zone switches to the full state. A full zone is one that is completely filled with data, and has no more available sectors or LBAs to write data to (i.e., WP=ZSLBA+zone capacity (ZCAP)). In a full zone, the write pointer points to the end of the writeable capacity of the zone. Read commands of data stored in full zones may still be executed.

The zones may have any total size such as 256 MiB or 512 MiB. However, a small portion of each zone may be inaccessible to write data to, but may still be read, such as a portion of each zone storing the parity data and one or more excluded blocks. For example, if the total size of a zone 206 is 512 MiB, the ZCAP may be 470 MiB, which is the capacity available to write data to, while 42 MiB are unavailable to write data. The zone capacity (ZCAP) or writeable capacity of a zone is equal to or less than the total zone storage size. The storage device 200 may determine the ZCAP of each zone upon zone reset. For example, the controller 208 or the ZM may determine the ZCAP of each zone. The storage device 200 may determine the ZCAP of a zone when the zone is reset.

The ZM may reset a full zone, scheduling an erasure of the data stored in the zone such that the zone switches back to an empty zone. When a full zone is reset, the zone may not be immediately cleared of data, though the zone may be marked as an empty zone ready to be written to. However, the reset zone must be erased prior to switching to an open and active zone. A zone may be erased any time between a ZM reset and a ZM open. Upon resetting a zone, the storage device 200 may determine a new ZCAP of the reset zone and update the Writeable ZCAP attribute in the zone metadata. An offline zone is a zone that is unavailable to write data to. An offline zone may be in the full state, the empty state, or in a partially full state without being active.

Since resetting a zone clears or schedules an erasure of all data stored in the zone, the need for garbage collection of individual blocks is eliminated, improving the overall garbage collection process of the storage device 200. The storage device 200 may mark one or more blocks for erasure. When a new zone is going to be formed and the storage device 200 anticipates a ZM open, the one or more blocks marked for erasure may then be erased. The storage device 200 may further decide and create the physical backing of the zone upon erase of the blocks. Thus, once the new zone is opened and blocks are being selected to form the zone, the blocks will have been erased. Moreover, each time a zone is reset, a new order for the LBAs and the write pointer 210 for the zone 206 may be selected, enabling the zone 206 to be tolerant to receive commands out of sequential order. The write pointer 210 may optionally be turned off such that a command may be written to whatever starting LBA is indicated for the command.

Referring back to FIG. 2A, when the host sends a write command to write data to a zone 206, the controller 208 pulls-in the write command and identifies the write command as a write to a newly opened zone 206. The controller 208 selects a set of blocks to store the data associated with the write commands of the newly opened zone 206 to, and the newly opened zone 206 switches to an active zone 206. The write command may be a command to write new data, or a command to move valid data to another zone for garbage collection purposes. The controller 208 is configured to DMA read new commands from a submission queue populated by a host device.

In an empty zone 206 just switched to an active zone 206, the data is assigned to the zone 206 and the associated set of sequential LBAs of the zone 206 starting at the ZSLBA, as the write pointer 210 is indicating the logical block associated with the ZSLBA as the first available logical block. The data may be written to one or more blocks or NAND locations that have been allocated for the physical location of the zone 206. After the data associated with the write command has been written to the zone 206, a write pointer 210 is updated to point to the next LBA available for a host write (i.e., the completion point of the first write). The write data from this host write command is programmed sequentially into the next available NAND location in the block selected for physical backing of the zone.

For example, the controller 208 may receive a first write command to a third zone 206c, or a first zone append command. The host identifies sequentially which logical block of the zone 206 to write the data associated with the first command to. The data associated with the first command is then written to the first or next available LBA(s) in the third zone 206c as indicated by the write pointer 210, and the write pointer 210 is advanced or updated to point to the next available LBA available for a host write (i.e., WP>0). If the controller 208 receives a second write command to the third zone 206c, or a second zone append command, the data associated with the second write command is written to the next available LBA(s) in the third zone 206c identified by the write pointer 210. Once the data associated with the second command is written to the third zone 206c, the write pointer 210 once again advances or updates to point to the next available LBA available for a host write. Resetting the third zone 206c moves the write pointer 210 back to the $Z_c$SLBA (i.e., WP=0), and the third zone 206c switches to an empty zone.

Figure 3A:
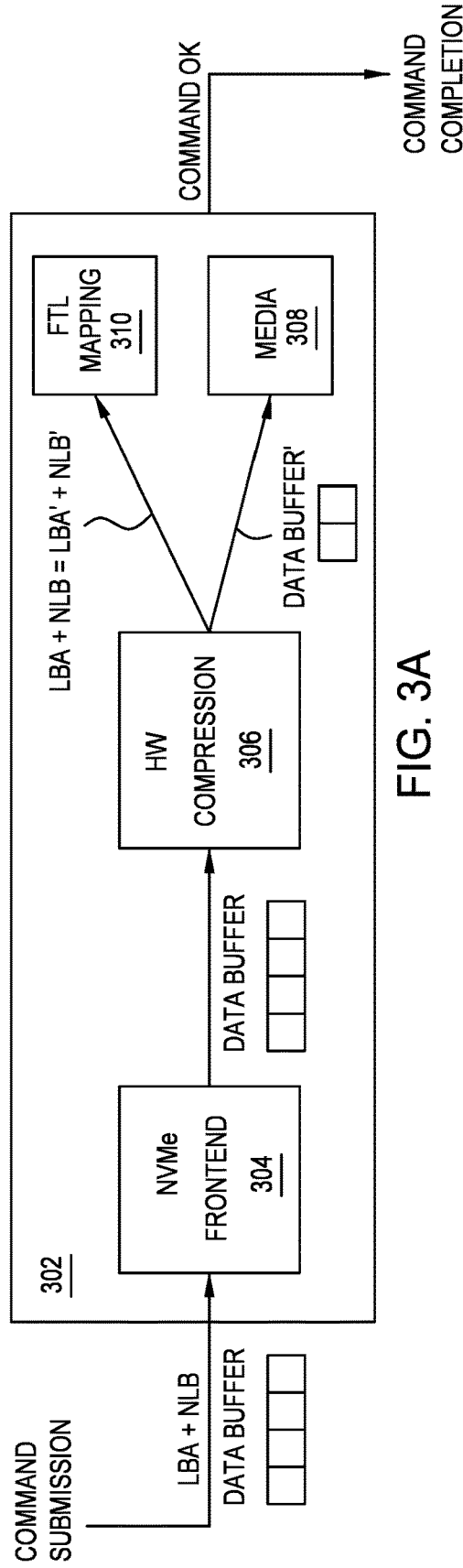
FIG. 3A illustrates a conventional compression solution, according to one embodiment.

FIG. 3A illustrates a conventional compression solution, according to one embodiment. The host, such as the host device 104 of FIG. 1, sends a write command to the storage device 302, such as the data storage device 106 of FIG. 1, to write a number of logical blocks (NLB) at a starting LBA. The write command may require a number of buffers, such as about 4 data buffers, to store the data associated with the write command. The NVMe frontend module 304 of the storage device 302 receives the NLB and the starting LBA location. After processing the write command, the storage device 302 moves the data and the buffers associated with the write command to the hardware (HW) compression module 306, where the NLB is compressed. The compressed data is stored in the media 308, such as the NVM 110 of FIG. 1, and the resulting LBA of the compressed data stored in the media 308 is recorded at a flash translation layer (FTL) mapping table 310. After both the compressed data is written to the media 308 and the location of the compressed data is recorded in the FTL mapping table 310, the storage device 302 returns a command completion response to the host indicating that the write command has been completed.

Figure 3B:
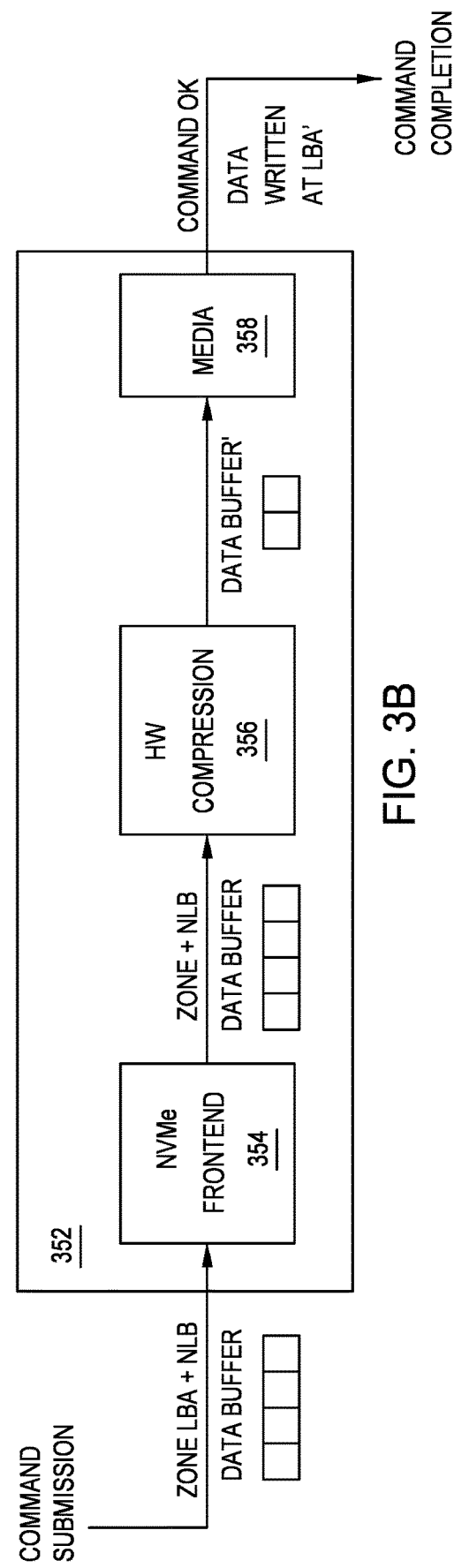
FIG. 3B illustrates a host-managed compression leveraging the ZNS protocol, according to one embodiment.

FIG. 3B illustrates a host-managed compression leveraging the ZNS protocol, according to one embodiment. The host, such as the host device 104 of FIG. 1, sends a write command to the storage device 302, such as the data storage device 106 of FIG. 1, to write a number of logical blocks (NLB) at an LBA of a zone. Because the host may dictate the placement of the NLB to a zone in the memory of the storage device, such as a first zone of the NVM 110 of FIG. 1, the host may have a record of the data written to the NVM. The NVMe frontend module 354 of the storage device 352 receives the NLB and the target LBA of a zone. After processing the write command, the storage device 352 moves the data and the buffers associated with the write command to the HW compression module 356, where the NLB is compressed. The compressed data is stored in the media 358, such as the NVM 110 of FIG. 1. After the compressed data is written to the media 358, the storage device 352 returns a command completion response to the host indicating that the write command has been completed. Furthermore, the assigned LBA for the programmed write command is returned to the host, such that the host is notified of the location of the compressed data in the NVM.

Figure 4:
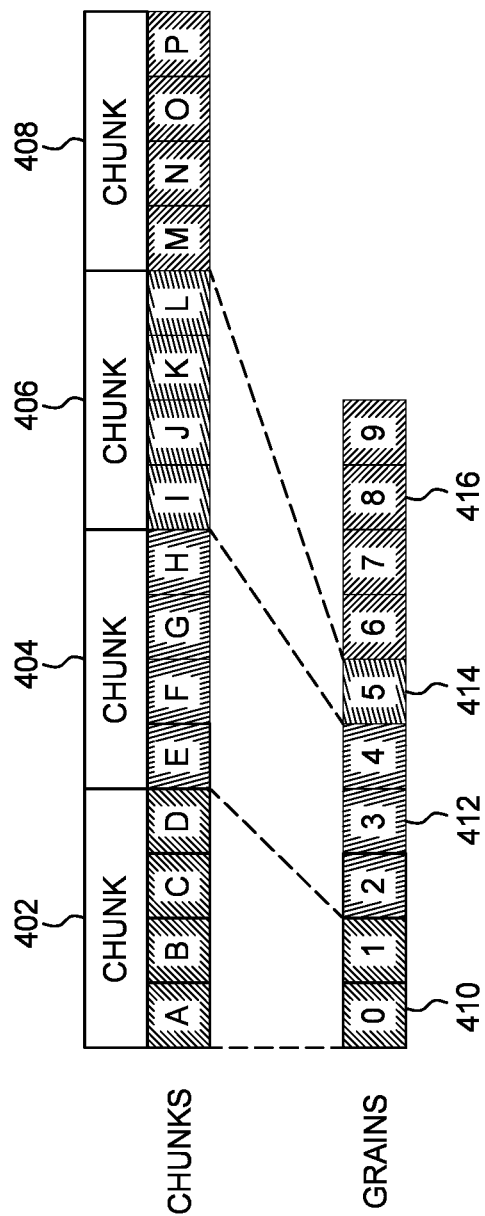
FIG. 4 illustrates the compression of data from a chunk to a number of grains, according to one embodiment.

FIG. 4 illustrates the compression of data from a chunk to a number of grains, according to one embodiment. The hardware compression module, such as the HW compression module 306, 356 of FIGS. 3A-3B, operates on a chunk of data. The chunk of data is a power-of-2 multiple of logical blocks. For example, a chunk of data may include either about 2, about 4, about 8, about 16, about 32, and so-on logical blocks. Each logical block may have a size of about 4 KB, where writes to the logical blocks may align with each 4 KB logical block size. Furthermore, each logical block of about 4 KB size may be referred to as a grain. The chunk of data is compressed to an integral number of grains depending on the compression ratio. For example, a first chunk of data includes about 16 KB of data or about 4 grains. When the maximum compression ratio is about 4:1, the about 16 KB of data may compress to about 4 KB of data or about 1 grain. However, the 4:1 compression may compress the 16 KB data to either about 1 grain, about 2 grains, or about 3 grains. In some embodiments, the compression may not work and the resulting "compressed" data size equals the data size prior to compressing the data. The maximum achievable compression ratio may be limited by the number of grains in an uncompressed chunk.

For example, in FIG. 4, each chunk 402, 404, 406, 408 includes 4 logical blocks. If the compression ratio is about 4:1, then the maximum compression of logical blocks from the chunk size to the grain size is a factor of about 4. The compression ratio may be determined by dividing the chunk size by the grain size. For example, if the chunk of data includes 4 grains, each of a 4 KB size, then the size of the chunk is about 16 KB. The maximum achievable compression ratio may be calculated as 16 KB/4 KB or about 4:1. The first chunk 402 includes 4 logical blocks A-D. After compression, the corresponding grains to the first chunk 402 is a first compressed chunk 410 that includes 2 grains. Hence, while the maximum compression ratio is 4:1, for chunk 402, the compression was only able to compress the data in a ratio of 2:1. Likewise, the second chunk 404 is compressed from 4 logical blocks or grains to 3 logical blocks or grains in the second compressed chunk 412 such that the compression ratio is 4:3 rather than the maximum of 4:1. The third chunk 406 is compressed from 4 logical blocks or grains to 1 logical block or grain in the third compressed chunk 414 for a perfect compression. The compression from 4 logical blocks or grains to 1 logical block or grain may represent a fully compressed chunk, or a best case scenario. However, if the data fails to compress at all, then the number of logical blocks between the chunk and the relevant grain remains the same. For example, the fourth chunk 408 includes 4 logical blocks or grains. After compressing the fourth chunk 408, 4 logical blocks or grains remain in the fourth non-compressed chunk 416, indicating that the 4 logical blocks or grains associated with the fourth chunk 408 did not compress. In the description herein, the term "logical block" may be referred to as "grain", interchangeably, for exemplary purposes.

Figure 5A:
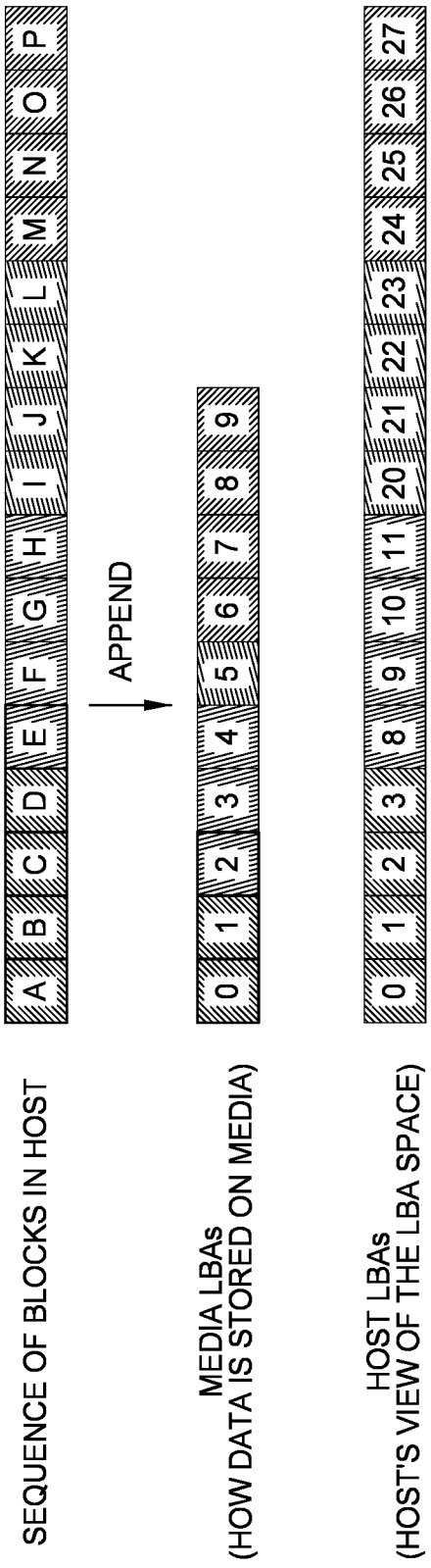
FIG. 5A illustrates a linear logical block address range, according to one embodiment.

FIG. 5A illustrates a linear host logical block address range, according to one embodiment. The sequence of blocks in the host includes a first chunk that includes logical blocks A-D, a second chunk that includes logical blocks E-H, a third chunk that includes logical blocks I-L, and a fourth chunk that includes logical blocks M-P. The host appends the 16 blocks to a zone, such as the first zone of the plurality of zones. When the compression engine, such as the compression engine 120 of the controller 108 of FIG. 1, receives the logical blocks, the compression engine compresses the data with respect to a compression ratio, such as about 4:1. After compressing the logical blocks of the plurality of chunks to an integral number of grains, the compressed data is written to a first zone. As described herein, the host LBA refers to the logical block address that the host utilizes to communicate with the drive and the media LBA refers to the location of the data where the ZNS append command places the data within the NVM. The host LBA and the media LBA may have a relationship such as, Host LBA=(Media LBA*constant)+offset of block within a compressed block (e.g., number of grains from the start of a compressed chunk section).

In FIG. 5A, the first chunk A-D is compressed to a first compressed chunk section that includes the logical blocks 0 and 1 as the compression was able to achieve a 2:1 compression. The logical blocks 0 and 1 are stored in the media and recorded as media LBA 0 and media LBA 1. When the second chunk E-H is compressed to a second compressed chunk section, the resulting that media LBAs are media LBA 2, media LBA 3, and media LBA 4 as the compression was able to achieve a 4:3 compression. However, because of the maximum achievable 4:1 compression ratio, the next available location in the LBA space from the host's point of view is host LBA 8 because the host believes the first grain section utilized LBAs 0-7 (i.e., 2 media LBAs times the perfect compression of 4 equals 8 host LBAs). The second chunk utilizes host LBA 8 to LBA 19 in the host's view of the LBA space because the host believes the second grain section utilized 12 LBAs (i.e., 3 media LBAs times the perfect compression of 4 equals 12 host LBAs). Similarly, when the third chunk I-L is compressed to a third compressed chunk section that includes a single media LBA 5 due to perfect compression ratio of 4:1, the host LBAs 20-23 are reported to the host as used by the third chunk I-L because the host believes the third grain section utilized 4 LBAs (i.e., 1 media LBA times the prefect compression of 4 equals 4 host LBAs), though the data stored in the media has a single media LBA recorded. When the chunk is not compressed, such as the fourth chunk M-P, the number of media LBAs utilized matches the number of host LBAs utilized. By utilizing a linear logical block address range, the storage device may report to the device a capacity that is the compression ratio times the actual capacity of the storage device. For example, if the maximum compression ratio is about 4:1 and the actual capacity of the storage device is about 128 GB, then the reported capacity may be about 512 GB, or 4 times the actual capacity.

When receiving a read request that includes a host LBA to be read, the controller utilizes the host LBA to read and decompress the relevant LBA. For example, if the host LBA is 22, then the drive reads and decompresses LBA 5 in the media LBA. The LBA 5 is found by taking the host LBA divided by the maximum compression ratio, where the result is rounded down. The relevant block associated with the host LBA 22 is then read and sent to the host.

Figure 5B:
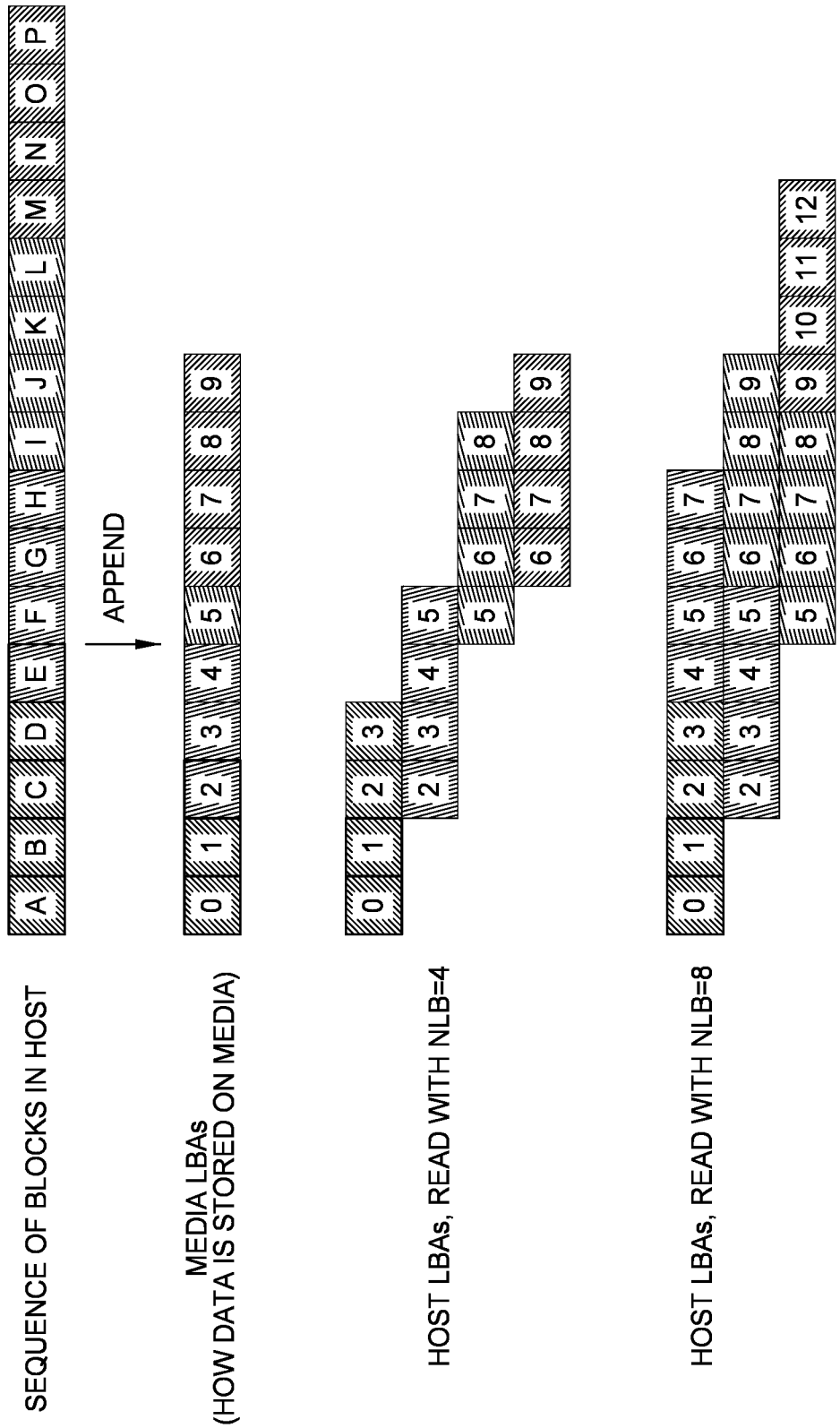
FIG. 5B illustrates a non-linear logical block address range, according to another embodiment.

FIG. 5B illustrates a non-linear host logical block address range, according to another embodiment. The sequence of blocks in the host includes a first chunk that includes logical blocks A-D, a second chunk that includes logical blocks E-H, a third chunk that includes logical blocks I-L, and a fourth chunk that includes logical blocks M-P. The host appends the 16 blocks to a zone, such as the first zone of the plurality of zones. When the compression engine, such as the compression engine 120 of the controller 108 of FIG. 1, receives the logical blocks, the compression engine compresses the data with respect to a maximum compression ratio, such as about 4:1. After compressing the logical blocks of the plurality of chunks to an integral number of grains, the compressed data is written to a first zone. As described herein, the host LBA refers to the logical block address that the host utilizes to communicate with the drive and the media LBA refers to the location of the data where the ZNS append command places the data within the NVM. The host LBA and the media LBA may have a relationship such as, Host LBA=(Media LBA*constant)+offset of block within a compressed block (e.g., number of grains from the start of a grain section).

Unlike the linear logical block address range of FIG. 5A, the host logical block address range of FIG. 5B capacity is equal to the capacity of the drive. Furthermore, instead of a linear host logical block address range, the host logical block address range of FIG. 5B is stepped. For example, when the NLB is equal to 4, each line of the each step includes 4 host LBAs. Likewise, when the NLB is equal to 8, each line of each step includes 8 host LBAs.

In the following description, the NLB is equal to 4. After appending the compressed data to the media, the host records the location of the LBA as a host LBA, whereas the location on the media is the media LBA. For example, the first chunk A-D is compressed and programmed to the first media LBA 0 and the second media LBA 1. When the host stores the host LBAs of the data, the first step includes host LBAs 0-3, which corresponds with the number of logical blocks prior to compressing the data. The second chunk E-H is compressed from four logical blocks or grains to three grains (i.e., three logical blocks) and programmed to the media as media LBAs 2-4. The second step of the host logical block address range includes host LBAs 2-5, where the host LBA 2 and the host LBA 3 of the second step is located under the host LBA2 and the host LBA 3 of the first step. Because the first chunk was compressed to two media LBAs, the host LBAs of the second chunk start at the third host LBA, LBA 2. Furthermore, the start of each step of the host LBAs correspond with the first grain of each grain section of the media LBAs.

Figure 6:
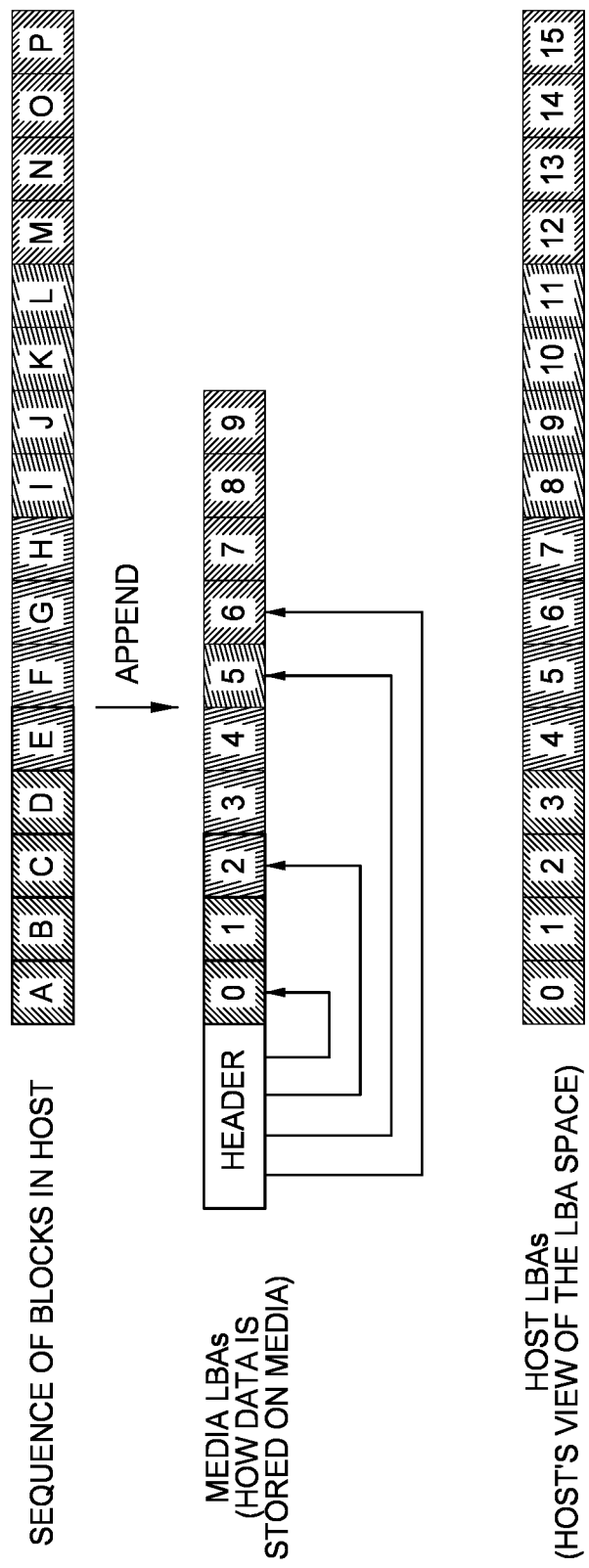
FIG. 6 illustrates appending a header to the media LBA, according to one embodiment.

FIG. 6 illustrates appending a header to the media LBA, according to one embodiment. Aspects of FIG. 6 may be similar to the embodiments described in FIGS. 5A-5B. In FIG. 6, the controller, such as the controller 108 of FIG. 1, attaches a header to the media LBAs after the sequence of blocks in the host has been appended. The header includes information such as the starting logical block of each compressed chunk in the media LBA. For example, the first chunk A-D compresses to two grains, 0 and 1, the second chunk E-H compresses to three grains, 2-4, the third chunk I-L compresses to one grain, 5, and the fourth chunk does not compress. The header includes pointers that point to media LBA 0, media LBA 2, media LBA 5, and media LBA 6. The media LBA 0 corresponds with the first block A, the media LBA 2 corresponds with the fifth block E, the media LBA 5 corresponds with the ninth block I, and the media LBA 6 corresponds with the thirteenth block M.

Figure 7:
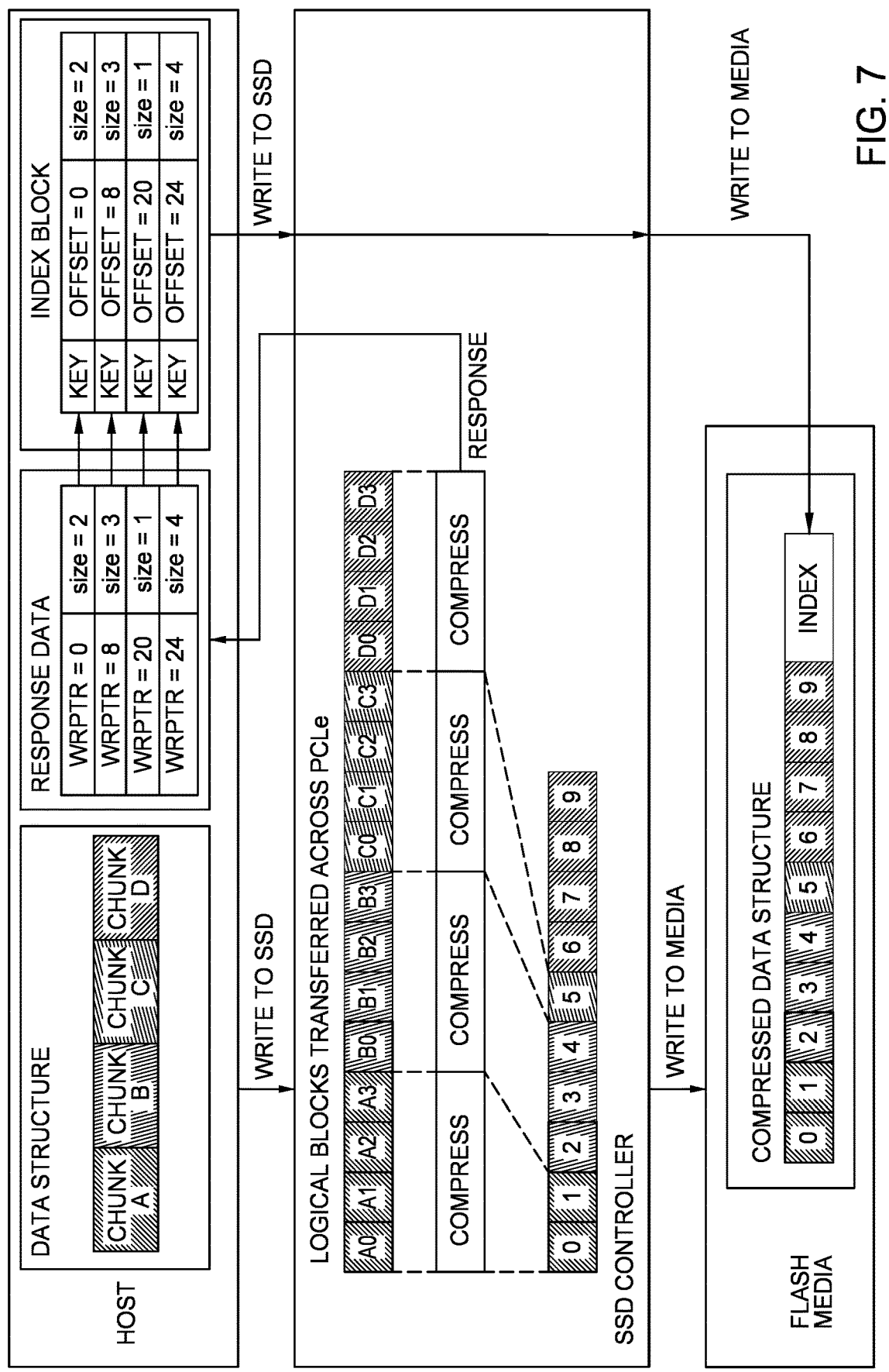
FIG. 7 illustrates an implementation of the host-managed compression leveraging the ZNS protocol, according to one embodiment.

FIG. 7 illustrates an implementation of the host-managed compression leveraging the ZNS protocol, according to one embodiment. The host, such as the host device 104 of FIG. 1, appends one or more blocks of data to one or more zones of the storage device, such as a SSD. When the controller, such as the controller 108 of FIG. 1, receives the one or more blocks, the compression engine, such as the compression engine 120 of FIG. 1, compresses the data from a number of chunks including a first number of logical blocks or grains to a second number of logical blocks or grains. After compression, the controller returns the write pointers returned by the ZNS append commands. The write pointers correspond to the location of the LBA as seen by the host. For example, the write pointer (wrptr) 8 may be the host LBA 8. However, the corresponding media LBA may be media LBA 2. The host may utilize the write pointers to build an index block, where the index block includes an offset value representing the write pointer, the size of the data, and a key that corresponds to the data. The index block of the host appends to the relevant zone of the flash media (e.g., the NVM 110 of FIG. 1) as an index, where the index may be attached to the last logical block (e.g., media LBA 9) of the compressed data structure.

Figure 8:
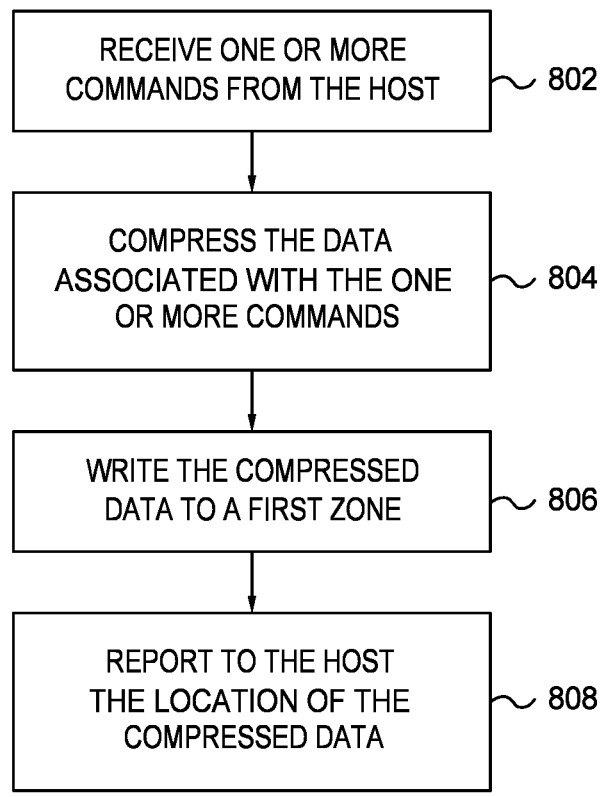
FIG. 8 illustrates a method for writing data to a location in the non-volatile memory, according to one embodiment.

FIG. 8 illustrates a method 800 for writing data to a location in the non-volatile memory, according to one embodiment. At block 802, the controller, such as the controller 108 of FIG. 1, of the storage device, such as the data storage device 106 of FIG. 1, receives one or more commands from the host, such as the host 104 of FIG. 1, to write data to a first zone of a plurality of zones. At block 804, the compression engine, such as the compression engine 120 of FIG. 1, utilizes the maximum compression ratio to compress the data associated with the write command from a first chunk including a first number of logical blocks or grains to a first compressed chunk including a second number of logical blocks of a plurality of grains. The first number of logical blocks or grains may be equal to or greater than the second number of logical blocks or grains.

Furthermore, the compression engine may utilize a maximum compression ratio, such as a 4:1 ratio. The compression ratio may determine the maximum possible change from the first number of logical blocks to the second number of logical blocks. For example, when the compression ratio is 4:1, then the 4 logical blocks may be compressed to either 1 logical block, 2 logical blocks, 3 logical blocks, or not compressed, where 1 logical block signifies that the 4 logical blocks have been fully compressed with respect to the maximum compression ratio. Likewise, when the compression ratio is 4:1 and 8 logical blocks are compressed, then the least amount of second logical blocks possible is 2 logical blocks.

At block 806, the compressed data is written to a first zone. In one embodiment, a header may be written before the compressed data. The header may include pointers that point to the grains that correspond to the start of each compressed chunk. Each grain written to the first zone corresponds with a media LBA, where the media LBA represents the location of the grain in the media. At block 808, the information concerning the compressed data, such as the location of each grain, is reported to the host. Because the host operates using a ZNS append protocol, such as the ZNS append command described in FIGS. 2A-2B, the host acknowledges the location of the compressed data as a host LBA. In one embodiment, the host LBA range for each chunk is greater than the media LBA range of the compressed data. For example, a host LBA 22 may correspond to a media LBA 10. In one embodiment, the host LBA range may be a non-linear host logical block storage space, as described in FIG. 5B. In another embodiment, the host LBA range may be a linear host logical block storage space, as described in FIG. 5A.

Figure 9:
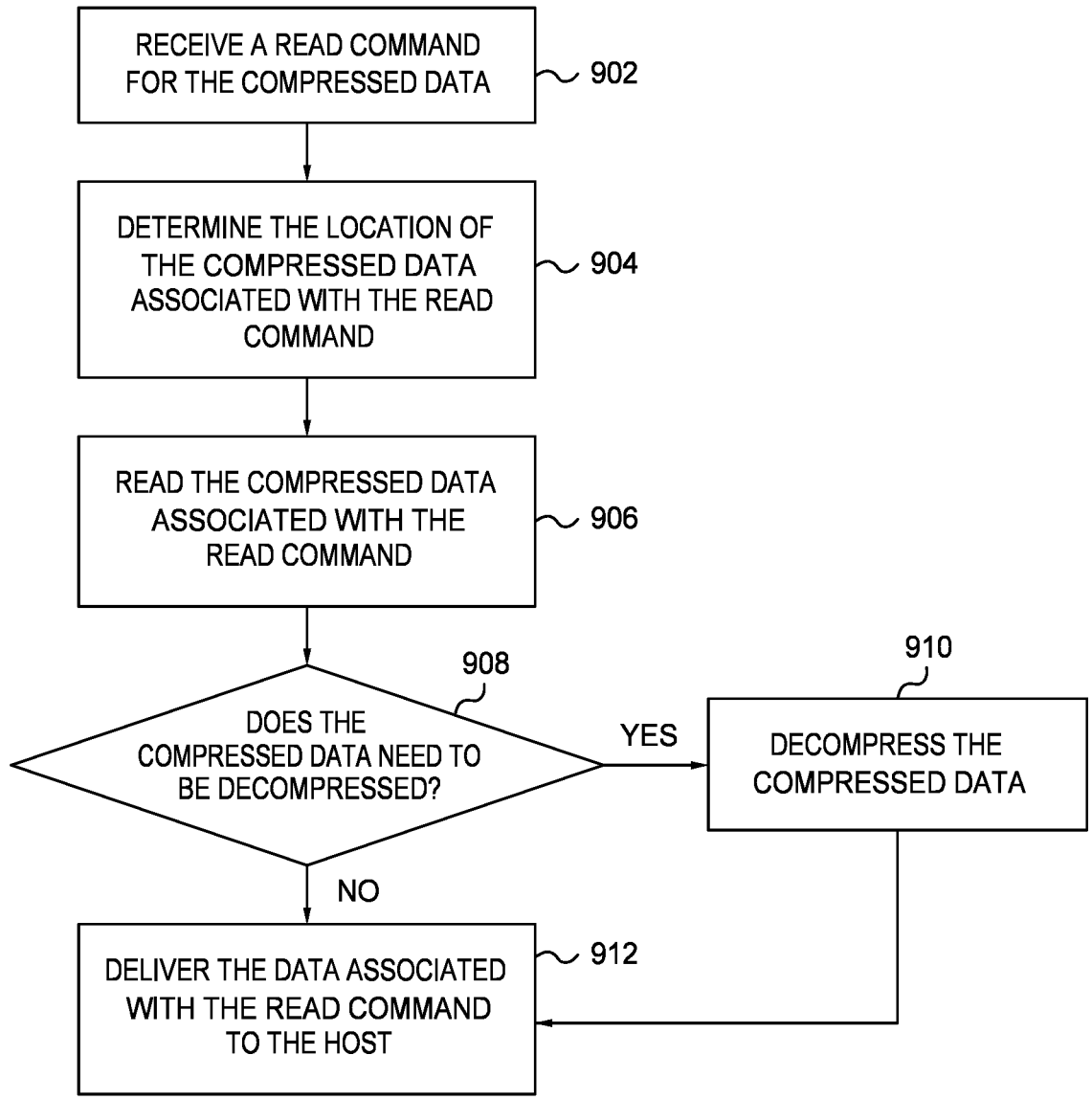
FIG. 9 illustrates a method for reading data from a location in the non-volatile memory, according to one embodiment.

FIG. 9 illustrates a method 900 for reading data from a location in the non-volatile memory, according to one embodiment. At block 902, the controller, such as the controller 108 of FIG. 1, receives a read command for the compressed data stored in the NVM of the storage device, such as the NVM 110 of the storage device 106 of FIG. 1, from the host, such as the host 104 of FIG. 1. At block 904, the controller determines location of the compressed data associated with the read command. The read command may include the host LBA of the data to be read, such as the host LBA 22. The controller may utilize the host LBA and the compression ratio of the compression engine to determine the media LBA to be read. For example, the host LBA 22 may correspond to the set of grains that include media LBA 10 to media LBA 13. Furthermore, the controller may utilize the header attached to the compressed data to determine the start grain of each compressed chunk.

At block 906, the controller reads the compressed data associated with the read command. Because the data is compressed into an integral number of grains, the data associated with the read command may be placed in separate adjacent grains. For example, the data associated with host LBA 22 may be in media LBA 11 and media LBA 12. At block 908, the controller determines if the compressed data needs to be decompressed. Because the compression engine may not compress a chunk of data, the resulting plurality of grains is the same as the logical blocks or grains of the chunk. However, if the compressed data need to be decompressed at block 908, the compression engine may decompress the data at block 910. At block 912, the decompressed data associated with the read command is delivered to the host.

By leveraging ZNS protocol when compressing and programming data, the storage device may have reduced amounts of required storage for metadata, higher effective throughput to and from the storage media, such as the NVM, lower power requirements to access the storage media, and increased storage media endurance.

In one embodiment, a data storage device includes a non-volatile storage unit, where a capacity of the non-volatile storage unit is divided into a plurality of zones, and a controller coupled to the non-volatile storage unit. The controller includes a compression engine. The controller is configured to receive one or more commands to write data to a first zone of the plurality of zones from a host device, where each command includes one or more chunks of data, compress one or more chunks of the one or more chunks of data to compressed data utilizing the compression engine, where the one or more chunks are compressed to one or more grains, and write the compressed data to a first location in the first zone.

The controller is further configured to report to the host device the first location, where reporting to the host device includes providing the host device with a host delivered logical block address (LBA) range for each chunk of compressed data that is greater than an actual LBA range of the compressed data. The controller is further configured to receive an index from the host device after reporting to the host device. The logical block address range is a non-linear logical block storage space. The controller is additionally configured to append a header to the compressed data. The header comprises metadata indicating a location of the one or more chunks. The compression engine is capable of compressing data at a compression ratio, where the compression ratio determines the maximum change from a first number of logical blocks to a second number of logical blocks when compressing the data.

In another embodiment, a data storage device includes a non-volatile storage unit, where a capacity of the non-volatile storage unit is divided into a plurality of zones, and a controller coupled to the non-volatile storage unit. The controller includes a compression engine. The controller is configured to receive one or more commands to write data to a first zone of a plurality of zones from a host device, receive data associated with the one or more commands from the host device, group the received data into chunks, utilize the compression engine with a compression ratio to compress the data associated with the one or more commands from a chunk to an integral number of grains, write the compressed data associated with one or more commands to a first location in the first zone, record the first location, where the first location includes a media logical block address (LBA) and a host LBA, and report to the host device the host LBA.

The controller is further configured to receive a read command for the compressed data stored in the first zone, determine the first location of the compressed data associated with read command, read the data associated with the read command, and deliver the data to the host device. The read command includes the host LBA. The determining of the first location utilizes the compression ratio to convert the host LBA to the media LBA. The media LBA includes a header. The header stores the first location of each compressed chunk. The controller is further configured to determine if the compressed data will need to be decompressed and decompress data determined to need to be decompressed.

In another embodiment, a data storage device includes a non-volatile storage unit, where a capacity of the non-volatile storage unit is divided into a plurality of zones. The data storage device further includes means to compress data received from a host device, where the means to compress data is coupled to the non-volatile storage unit, means to write compressed data to logical block address (LBA) range in at least one zone of the plurality of zones, where the means to write compress data is coupled to the non-volatile storage unit, and means to report a host LBA range to the host device, where the host LBA range is different from the LBA range where the compressed data is written, wherein the means to report is coupled to the non-volatile storage unit.

The data storage device further includes means to receive an index from the host device and write the index to the non-volatile storage unit. The index includes the location and size of the compressed data stored in the non-volatile storage. The data storage device further includes means to report a capacity of the one or more zones as a value that is greater than the capacity. The data storage device further includes means to decompress data, where the means to decompress data is coupled to the non-volatile storage unit.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a non-volatile storage unit, wherein a capacity of the non-volatile storage unit is divided into a plurality of zones; and
   a controller coupled to the non-volatile storage unit, the controller comprising a compression engine, wherein the controller is configured to:
   receive one or more commands to write data to a first zone of the plurality of zones from a host device, wherein each command includes one or more chunks of data;
   compress one or more chunks of the one or more chunks of data to compressed data utilizing the compression engine, wherein the one or more chunks are compressed to one or more grains;

write the compressed data to a first location in the first zone; and report to the host device the first location, wherein reporting to the host device comprises providing the host device with a host delivered logical block address (LBA) range for each chunk of compressed data that is greater than an actual LBA range of the compressed data.

2. The data storage device of claim 1, wherein the logical block address range is a non-linear logical block storage space.

3. The data storage device of claim 1, wherein the controller is additionally configured to append a header to the compressed data.

4. The data storage device of claim 3, wherein the header comprises metadata indicating a location of the one or more chunks.

5. The data storage device of claim 1, wherein the compression engine is capable of compressing data at a compression ratio, wherein the compression ratio determines the maximum change from a first number of logical blocks to a second number of logical blocks when compressing the data.

6. A data storage device, comprising:

a non-volatile storage unit, wherein a capacity of the non-volatile storage unit is divided into a plurality of zones; and a controller coupled to the non-volatile storage unit, the controller comprising a compression engine, wherein the controller is configured to:

receive one or more commands to write data to a first zone of the plurality of zones from a host device, wherein each command includes one or more chunks of data;

compress one or more chunks of the one or more chunks of data to compressed data utilizing the compression engine, wherein the one or more chunks are compressed to one or more grains;

write the compressed data to a first location in the first zone;

report to the host device the first location; and receive an index from the host device after reporting to the host device.

7. The data storage device of claim 6, wherein the controller is additionally configured to append a header to the compressed data.

8. The data storage device of claim 7, wherein the header comprises metadata indicating a location of the one or more chunks.

9. The data storage device of claim 6, wherein the compression engine is capable of compressing data at a compression ratio, wherein the compression ratio determines the maximum change from a first number of logical blocks to a second number of logical blocks when compressing the data.

10. A data storage device, comprising:

a non-volatile storage unit, wherein a capacity of the non-volatile storage unit is divided into a plurality of zones; and a controller coupled to the non-volatile storage unit, the controller comprising a compression engine, wherein the controller is configured to:

receive one or more commands to write data to a first zone of a plurality of zones from a host device;

receive data associated with the one or more commands from the host device;

group the received data into chunks;

utilize the compression engine with a compression ratio to compress the data associated with the one or more commands from a chunk to an integral number of grains;

write the compressed data associated with one or more commands to a first location in the first zone;

record the first location, wherein the first location includes a media logical block address (LBA) and a host LBA; and report to the host device the host LBA, wherein reporting to the host device comprises providing the host device with a host delivered LBA range for each chunk of compressed data that is greater than an actual LBA range of the compressed data.

11. The data storage device of claim 10, wherein the controller is further configured to:

receive a read command for the compressed data stored in the first zone;

determine the first location of the compressed data associated with read command;

read the data associated with the read command; and deliver the data to the host device.

12. The data storage device of claim 11, wherein the read command includes the host LBA.

13. The data storage device of claim 11, wherein determining the first location utilizes the compression ratio to convert the host LBA to the media LBA.

14. The data storage device of claim 13, wherein the media LBA includes a header.

15. The data storage device of claim 14, wherein the header stores the first location of each compressed chunk.

16. The data storage device of claim 10, wherein the controller is further configured to:

determine if the compressed data will need to be decompressed; and decompress data determined to need to be decompressed.

17. A data storage device, comprising:

a non-volatile storage unit, wherein a capacity of the non-volatile storage unit is divided into a plurality of zones;

means to compress data received from a host device, wherein the means to compress data is coupled to the non-volatile storage unit;

means to write compressed data to logical block address (LBA) range in at least one zone of the plurality of zones, wherein the means to write compress data is coupled to the non-volatile storage unit;

means to report a host LBA range to the host device, wherein the host LBA range is different from the LBA range where the compressed data is written, wherein the means to report is coupled to the non-volatile storage unit; and means to receive an index from the host device and write the index to the non-volatile storage unit.

18. The data storage device of claim 17, wherein the index includes a location and size of the compressed data stored in the non-volatile storage.

19. The data storage device of claim 17, further comprising means to report a capacity of the one or more zones as a value that is greater than the capacity.

20. The data storage device of claim 17, further comprising means to decompress data, wherein the means to decompress data is coupled to the non-volatile storage unit.

* * * * *